June 2, 1936.                    D. SLICK                    2,043,123
                             DEMOUNTABLE WHEEL
                            Filed Aug. 14, 1935                2 Sheets-Sheet 1
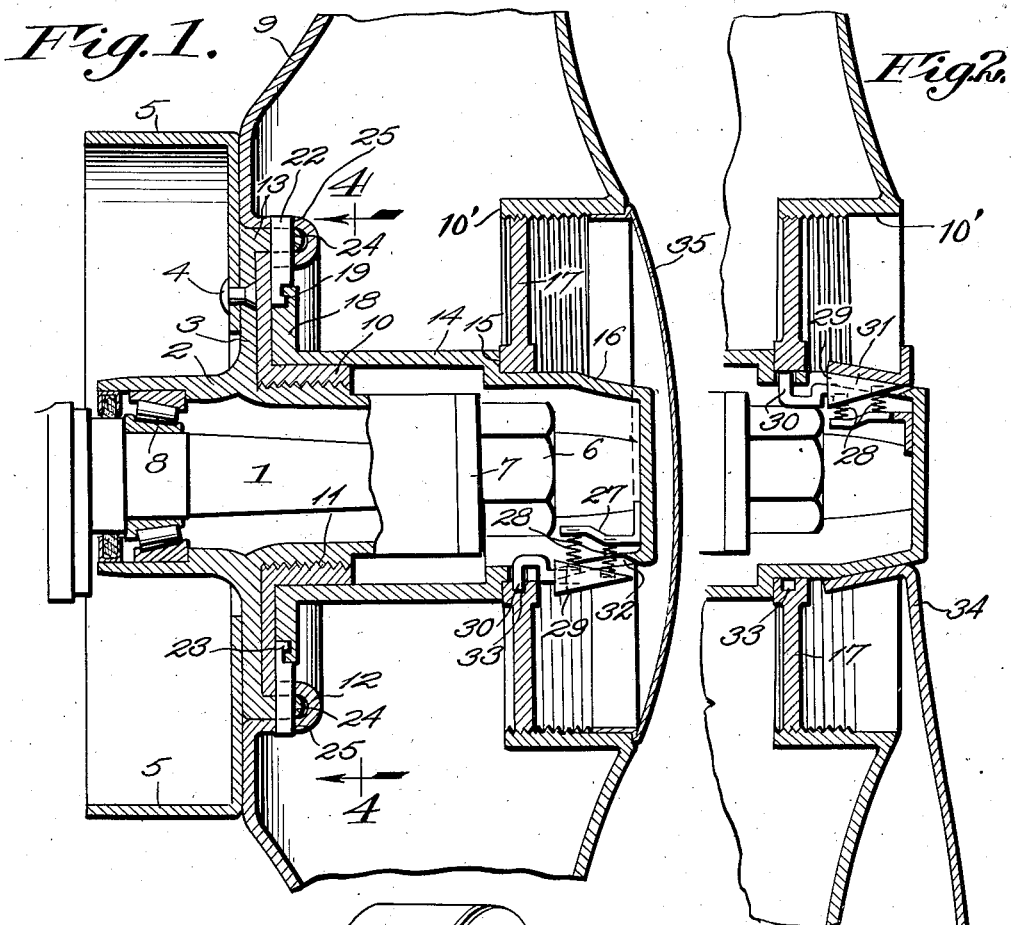
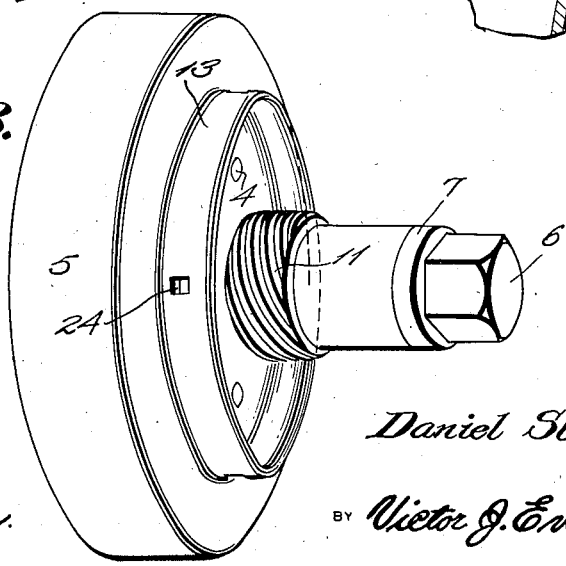
Daniel Slick
INVENTOR
BY Victor J. Evans & Co.
ATTORNEY
WITNESS June 2, 1936.  D. SLICK  2,043,123
DEMOUNTABLE WHEEL
Filed Aug. 14, 1935  2 Sheets-Sheet 2

Daniel Slick
INVENTOR
BY Victor J. Evans & Co.
ATTORNEY

R. E. Wise.
WITNESS

Patented June 2, 1936

2,043,123

UNITED STATES PATENT OFFICE 2,043,123

DEMOUNTABLE WHEEL

Daniel Slick, Superior, Wis.

Application August 14, 1935, Serial No. 36,191

5 Claims. (Cl. 301—9)

My invention relates to improvements in demountable wheels and the primary object thereof is to provide a demountable wheel equipped with efficient locking means whereby the wheel may be readily mounted over the axle spindle of an automobile or removed therefrom by a minimum number of operations and which when locked is secure against accidental unlocking under any conditions.

Other and subordinate objects are also comprehended by my invention, all of which will presently appear when the following description and claims are read with reference to the drawings accompanying and forming a part of this specification.

In said drawings:

Figure 1 is a fragmentary view in vertical transverse section of an automobile axle spindle, brake drum, and axle skein and an automobile wheel equipped according to my invention, the wheel being locked in position.

Figure 2 is a similar view illustrating the manner in which the wheel is unlocked.

Figure 3 is a view in perspective of the brake drum, part of the axle skein and a locking flange on the axle skein, all forming part of my improved wheel locking means.

Figure 4:
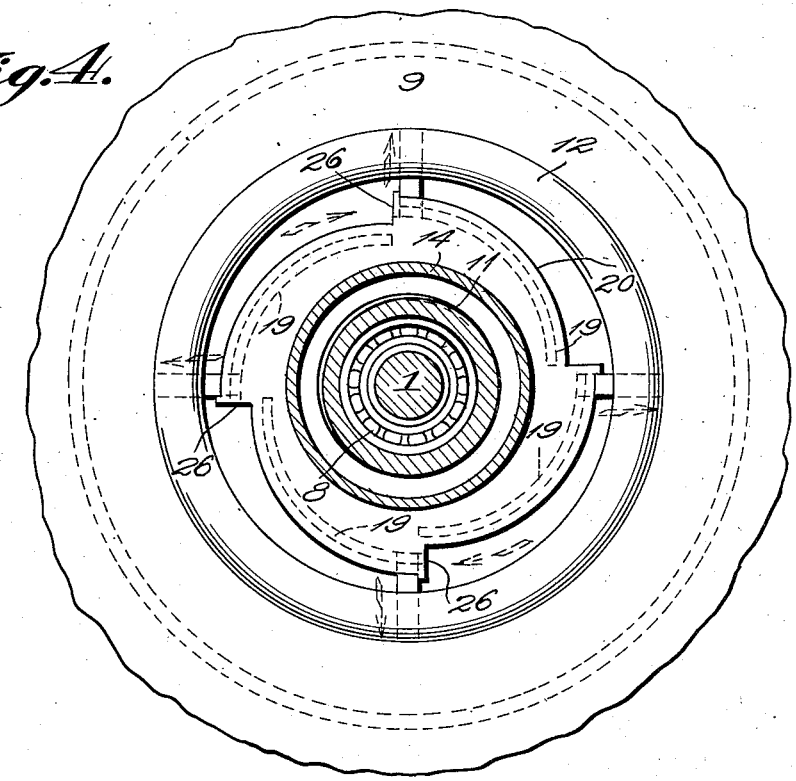
Figure 4 is a view in vertical section taken on the line 4—4 of Figure 1, looking in the direction indicated by the arrows.
Figure 5:
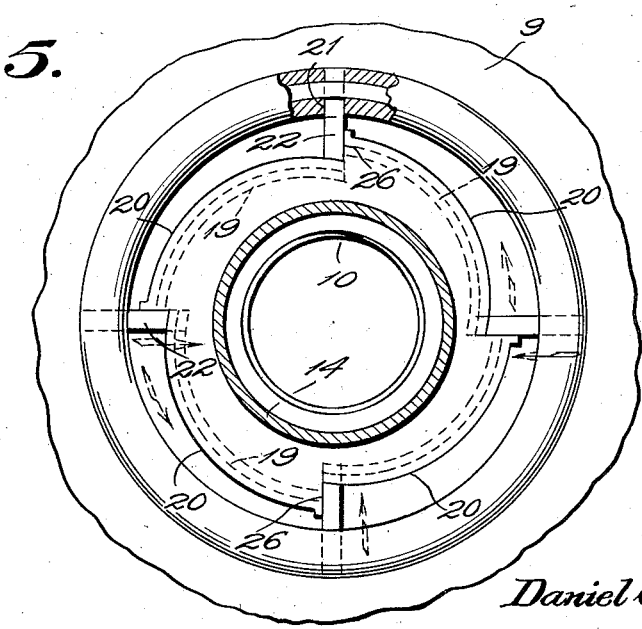
Figure 5 is a similar view, the parts being shown in unlocking position.

Describing my invention with reference to the drawings, 1 designates the usual automobile axle spindle and 2 the axle skein having an intermediate circular flange 3 to which is attached as at 4 the brake drum 5. The usual nut 6 and washer 7 secure the skein in proper position for rotation upon anti-friction bearings as at 8. The wheel 9 includes rear and front hub portions 10 and 10' and is threaded upon the axle skein 2 by means of the rear hub portion 10 being internally threaded for engagement with a threaded shoulder 11 on the axle skein adjacent the skein flange 3.

In this position the wheel is locked to the axle skein 2 by the following means. The wheel 9 has formed thereon a grooved annular portion 12 concentric to the axis of the wheel and opening rearwardly and which fits over an annular outwardly projecting locking flange 13 extending around the edge of the skein flange 3.

Rotatably mounted at its rear end on the hub portion 10 and fitting over the axle skein 2 is a locking shell 14 having a reduced front end, forming a shoulder 15, and a hexagonal nut-like portion 16. Adjacent its front end the shell 14 has a bearing in a retaining ring 17 threaded by left hand threads into the outer end of the wheel hub portion 10' and bearing against the aforesaid shoulder 15. The left hand thread connection between the retaining ring 17 and the hub portion 10' is to prevent the ring from working loose under rotation of the wheel.

At its rear end the shell 14 is provided with a radial flange 18 having in its rear face a plurality of eccentric cam grooves 19 and corresponding cam edges 20. Slidably mounted at their outer ends in radial openings 21, in the portion 12, are a plurality of preferably square locking bolts 22 mounted at their inner ends in said grooves 19 by reduced undercut portions 23 so that said bolts ride on the cam edges 20. The flange 13 is provided with a plurality of radial square apertures 24 designed to register with those in the portion 12 when the wheel 9 is screwed tight upon the axle skein 2. The arrangement of these parts is such that when the wheel 9 is in the proper position the bolts 22 can be projected through the apertures 24 in the flange 13 and into complemental apertures 25, in the portion 12 by turning the shell 14 clockwise to thereby lock the wheel 9 to the skein flange 3. Conversely said bolts 22 may be retracted to unlock the wheel 9 by turning said shell 14 in a counter-clockwise direction. Movement of the shell 14 in the last mentioned direction is limited by shoulders 26 formed by the juncture of the cam edges 20, whereby withdrawal of the bolts 22 from their end bearings in the portion 12 is obviated. The shell 14 in its wheel locking position is locked to the retaining ring 17 by the following means. Within the hexagonal portion 16 of the shell 14 and secured thereto is a bracket 27 on which is floatingly mounted, by springs 28, a locking member 29 comprising a hooked part 30 and a cam part 31 yieldingly urged by the springs 28 outwardly of the shell 14 through a slot 32 formed in the hexagonal portion 16, as shown in Figure 1. In this position of the locking member 29 the hooked part 30 cooperates with notches 33 in the retaining ring 17 to lock the shell 14 to the wheel. The cam part 31 of the locking member 29 is so designed that in the locking position of said member the latter may be pressed inwardly into unlocking position by the operation of positioning a wrench 34 over the hexagonal portion 16 to unlock the shell 14 from the ring 17 as shown in Figure 2. The outer end of the shell 14 and the retaining ring 17, together with contiguous parts, are protected by the usual dust cap 35 suitably secured in the outer end of the hub 10.

The wheel of my invention is demounted or removed as follows. The dust cap 35 having first been removed, the wrench 34 is positioned over the hexagonal portion 16 of the shell 14 as shown in Figure 2 which operation effects the unlocking of the shell 14 from the ring 17 in the manner previously described. The shell 14 is then given a partial turn counter-clockwise, in the present instance 90°, which operation retracts the locking bolts 22 to unlocking position releasing the same from the locking flange 13. The wheel 9 may then be removed by unscrewing the same from the axle skein 2. The operation of mounting the wheel will, it is believed be clear from the foregoing without further explanation. In connection with this operation, however, it may be stated that as soon as the wrench 34 is removed the locking member 29 snaps into locking position whereby the locking of the shell 14 to the retaining ring 17 is automatically effected.

It is to be noted that the mechanism of my invention provides for demounting a wheel by two major operations, that the mechanism is simple and provides for securely locking the wheel in position against accidental displacement. Furthermore, the wheel is always locked in correct alignment and there are no loose parts to become lost in replacing one wheel by another.

The foregoing constitutes a detailed description of a preferred embodiment of my invention. It is to be understood, however, that the disclosure is illustrative rather than restrictive and that right is herein reserved to modifications in detail and changes in relation of parts falling within the scope of the appended claims.

What I claim is:

1. In a demountable wheel, the combination with an axle spindle, of an axle skein rotatably mounted thereon and having a radial flange, a wheel having a hub part mounted on said skein, and cooperating devices on said wheel and flange, respectively, for locking said skein and wheel together and including, a cylindrical shell rotatably mounted on said hub part, and a plurality of locking bolts interlocking with said flange and movable to ineffective positions by rotation of said shell relative to said wheel.

2. In a demountable wheel, the combination with an axle spindle, of an axle skein rotatably mounted thereon and having a radial flange, a wheel having a hub part mounted on said skein, and cooperating devices on said wheel and flange, respectively, for locking said skein and wheel together and including, a cylindrical shell rotatably mounted on said hub part, a plurality of locking bolts interlocking with said flange and movable to ineffective positions by rotation of said shell relative to said wheel, and means for locking said shell to said wheel.

3. In a demountable wheel, the combination with an axle spindle, of an axle skein rotatably mounted thereon and having a radial web terminating in a laterally extending annulus concentric to said skein and provided with radial apertures, a wheel having a hub part mounted on said skein and an annular grooved part fitting over said annulus, said grooved part having radial apertures therein complemental to the apertures in said annulus, a cylindrical shell rotatably mounted on said hub part, a plurality of locking bolts extending into said apertures to lock said wheel to said skein and movable to ineffective positions by rotation of said shell relative to said wheel, and means for locking the shell to the wheel.

4. In a demountable wheel, the combination with an axle spindle, of an axle skein rotatably mounted thereon, a wheel having a rear hub part mounted on said skein and also having a front hub part, cooperating devices on said skein and in said wheel, respectively, for locking the wheel to the skein and comprising, a ring threaded into said front hub part, a cylindrical shell rotatably mounted on said rear hub part and in said ring, a plurality of locking bolts movable to ineffective positions by rotation of said shell relative to said wheel, and cooperating locking devices on said shell and ring, respectively, for locking the shell against rotation relative to said wheel.

5. In a demountable wheel, the combination with an axle spindle, of an axle skein rotatably mounted thereon and having a radial web terminating in a laterally extending annulus concentric to said skein and provided with radial apertures, a wheel having a rear hub part mounted on said skein and an annular grooved part fitting over said annulus, said grooved part having radial apertures therein complemental to the apertures in said annulus and said wheel also having a front hub part, and means for locking said annular grooved part over said annulus and including, a ring threaded into said front hub part, a cylindrical shell rotatably mounted on said rear hub part and in said ring, a plurality of locking bolts extending through the apertures in said grooved part and annulus, respectively, and movable to ineffective positions by rotation of said shell relative to said wheel, and cooperating locking devices on said shell and ring.

DANIEL SLICK.